No. 879,952. PATENTED FEB. 25, 1908.
J. A. ENRIGHT.
NAILLESS HORSESHOE.
APPLICATION FILED JUNE 10, 1907.

Witnesses
Carl Stoughton
F. G. Campbell

Inventor
John A. Enright
By Chester C. Shepherd
Attorney

UNITED STATES PATENT OFFICE.

JOHN A. ENRIGHT, OF COLUMBUS, OHIO.

NAILLESS HORSESHOE.

No. 879,952.  Specification of Letters Patent.  Patented Feb. 25, 1908.

Application filed June 10, 1907. Serial No. 378,135.

*To all whom it may concern:*

Be it known that I, JOHN A. ENRIGHT, a citizen of the United States, residing at Columbus, in the county of Franklin and State of Ohio, have invented certain new and useful Improvements in Nailless Horseshoes, of which the following is a specification.

My invention relates to nailless horse shoes and has for its object the provision of a device of this character constructed in such manner that it may be snapped over the hoof of an animal and held securely in place on said hoof without the use of the nails usually employed for that purpose.

A further object of the invention is the provision of an improved form of calk adapted to serve the double purpose of a calk and a fastening device.

Further objects and advantages of the invention will be set forth in the detailed description which now follows.

Figure 1:
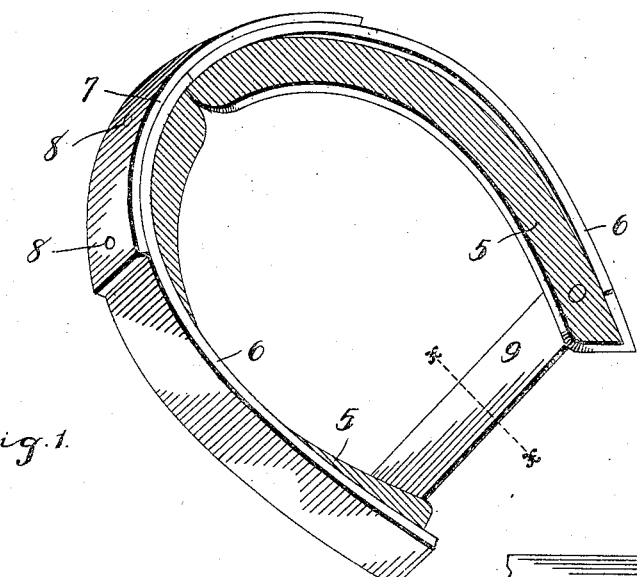
Figure 2:
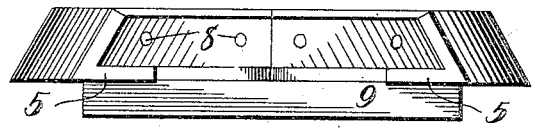
Figure 4:
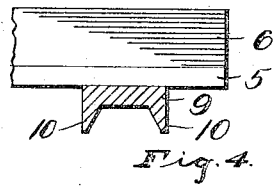
Figure 3:
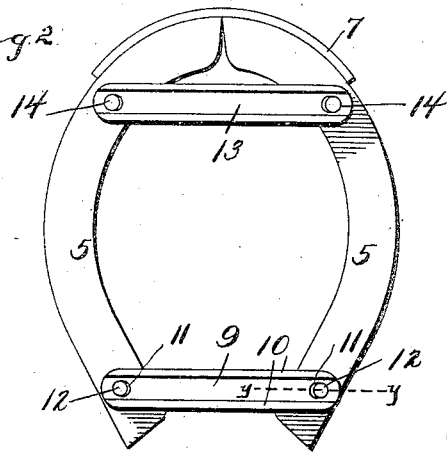

In the accompanying drawing: Figure 1 is a perspective view of a horse shoe constructed in accordance with the invention, Fig. 2 is a rear end elevation of said horse shoe, Fig. 3 is an underside view of said horse shoe, Fig. 4 is an enlarged sectional view upon line $x-x$ of Fig. 1, Fig. 5 is a detail plan view of a modified form of the device, and, Fig. 6 is a detail sectional view upon line $y-y$ of Fig. 3.

Like numerals designate corresponding parts in all of the figures of the drawing.

Referring to the drawing, the numerals 5 designate horizontal and flat portions of the horse shoe. Inwardly inclined walls 6 which conform to the curvature of a horse's hoof extend upwardly from the horizontal portions 5. As is clearly illustrated in Figs. 1 and 3, the shoe is constructed in two parts, each of said parts comprising a horizontal portion 5 and an inwardly inclined wall 6. A heavy and stiff spring plate 7, overlaps the juncture of the inclined walls 6 and is secured to said walls by fastening devices such as rivets 8. When it is desired to secure this shoe to the hoof of an animal, the walls 6 are spread apart against the tension of the spring 7 until said walls may be snapped over the inclined sides of the hoof of the animal. When these walls are released they spring back and engage the hoof. It has been found that this structure is sufficient to hold a shoe firmly in place, but if desired, a calk such as illustrated at 9 may be employed. This calk is in the form of a bar which is of U-shape in cross section and the walls 10 of said bar are adapted to cut into the earth and afford a firm grip for the foot of the animal. This bar is provided with openings 11 to permit said bar to be forced over rivets 12 which are carried at the rear portions of the horizontal portions 5 of the shoe. After the shoe has been placed upon the hoof of the animal, the extreme rear ends of the portions 5 may be forced toward each other until the openings 11 of the calk bar snap over the rivets 12. When the members 5 are released, the flaring heads of the rivets hold this bar in position. A toe calk 13 which is also U-shape in cross section, is adapted to engage rivets or other fastening devices 14 as is best illustrated in Fig. 3.

Figure 5:
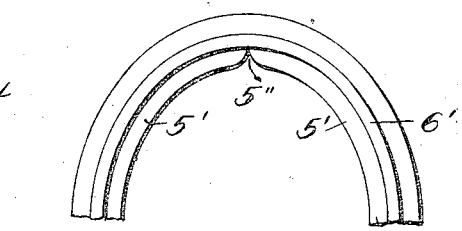
Figure 6:
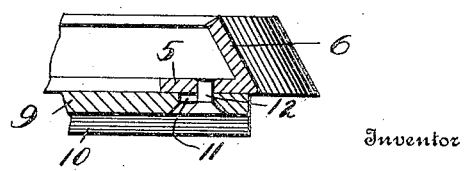

In Fig. 5 a form of shoe has been illustrated which may be made of stamped metal. In this form of the device the flat portions 5' are integral with a continuous inwardly inclined wall 6', this inclined wall and the portions 5' being formed of sheet metal and the wall 6' being of sufficient resilience to serve the purpose of the spring 7. The portions 5' are cut in or separated as at 5" to permit them to readily spread apart.

From the foregoing description, it will be seen that simple and efficient means are herein provided for accomplishing the objects of the invention, but while the elements shown and described are well adapted to serve the purposes for which they are intended, it is to be understood that the invention is not limited to the details of construction set forth, but includes within its purview such changes as may be made within the scope of the appended claims.

What I claim, is:

1. A horse shoe comprising a flat wearing portion and an inclined wall which is adapted to engage over the hoof of an animal, the opposite sides of the horse shoe being yieldingly connected to permit the opposed side walls to be forced away from each other, and a U-shaped bar adapted to connect the rear ends of the side walls of the horse shoe.

2. A horse shoe comprising a flat wearing portion and an inclined wall which is adapted to engage over the hoof of an animal, the opposite sides of the horse shoe being yieldingly connected to permit the opposed side walls to be forced away from each other, a U- shaped bar adapted to connect the rear ends of the side walls of the horse shoe, and a bar forming a calk which extends across the forward portion of the horse shoe.

3. A horse shoe formed in two sections, each of said sections comprising a flat wearing portion and an inwardly inclined wall, of a flat spring plate which overlaps the abutting inclined walls and is secured to said inclined walls.

In testimony whereof I affix my signature in presence of two witnesses.

JOHN A. ENRIGHT.

Witnesses:
A. L. PHELPS,
L. CARL STOUGHTON.